US012761953B2

(12) United States Patent
Blair et al.

(10) Patent No.: US 12,761,953 B2
(45) Date of Patent: Oct. 13, 2026

(54) PROCESSING OF QUEUED TASKS

(71) Applicant: PagerDuty, Inc., San Francisco, CA (US)

(72) Inventors: Ben Blair, San Francisco, CA (US); Ravi Singh, San Francisco, CA (US); Aly Simkins, San Francisco, CA (US)

(73) Assignee: PagerDuty, Inc., San Francisco, CA (US)

( * ) Notice: Subject to any disclaimer, the term of this patent is extended or adjusted under 35 U.S.C. 154(b) by 375 days.

(21) Appl. No.: 18/427,150

(22) Filed: Jan. 30, 2024

(65) Prior Publication Data

US 2025/0245042 A1 Jul. 31, 2025

(51) Int. Cl.
*G06F 9/48* (2006.01)

(52) U.S. Cl.
CPC .................................. *G06F 9/4881* (2013.01)

(58) Field of Classification Search
CPC ...................................................... G06F 9/4881
See application file for complete search history.

(56) References Cited

U.S. PATENT DOCUMENTS 11,681,273 B2 6/2023 Burns

FOREIGN PATENT DOCUMENTS

CA 2905503 A1 * 9/2014 ........... G08G 1/0129

* cited by examiner

*Primary Examiner* — Wissam Rashid
(74) *Attorney, Agent, or Firm* — Shumaker & Sieffert, P.A.

(57) ABSTRACT

Techniques are described for a system comprising processing circuitry configured to create a linear index, wherein the linear index includes a plurality of positions, each position of the plurality of positions defined by at least a first tier and a second tier of a plurality of tiers; assign a plurality of tasks to the plurality of positions based on task hash values associated with the plurality of tasks; generate a random position on the linear index, wherein the random position includes a random hash value within a range of possible hash values associated with the plurality of tiers; select, based on the random position, a populated position of the plurality of positions, wherein the populated position is assigned one or more tasks of the plurality of tasks; obtain information for the one or more tasks based on the populated position; process, based on the information, the one or more tasks.

20 Claims, 5 Drawing Sheets

PROCESSING OF QUEUED TASKS

TECHNICAL FIELD

This disclosure relates generally to managing queued tasks.

BACKGROUND

Operations computing systems may manage tasks submitted by computing systems registered to customer sites. Operations computing systems may address tasks by implementing services programmed to address particular tasks managed by the operations computing systems.

SUMMARY

Aspects of the present disclosure describe techniques for managing tasks in a queue. In general, an operations computing system may implement one or more services to accomplish processes or tasks in a non-discriminatory manner. The operations computing system may configure the one or more services to accomplish processes or tasks by processing data within the computing system or controlling some device or application executing at a customer site. The operations computing system may store tasks in one or more queues managed by a database executing at the operations computing system. In some instances, the operations computing system may store information for tasks that specify how to process the task (e.g., actions, processes, workflows, etc. for performing a task). The operations computing system may implement services to address tasks in a random or pseudo-random manner based on a random traversal through a linear index defined by a multi-tier classification hierarchy.

The techniques described herein may provide one or more technical advantages that realize one or more practical applications. For example, the operations computing system may fairly and efficiently address tasks from customers, no matter the volume or time tasks are submitted by customers. In other words, the operations computing system may address tasks from customers by not discriminating between customers or by not discriminating based on the volume or timestamps of tasks associated with customers. The operations computing system may implement fair queuing (e.g., fair queuing scheduling algorithms) to achieve fairness measured based on resources (e.g., processing resources, memory resources, etc.) the operations computing system uses to address tasks for various customers. The operations computing system may address tasks in a random or pseudo-random manner to minimize computational and performance drawbacks associated with addressing tasks from customers based on a number of tasks submitted by a customer or a time a customer submits tasks. In this way, the operations computing system may implement techniques that support a more scalable approach of multiple services addressing a high volume of tasks from various customers, in parallel, while minimizing or reducing computational and performance drawbacks, such as excessive processing and/or memory utilization, a delay in processing of tasks, lock-contention, or the like.

In one example, a system comprises one or more processors having access to a memory. The one or more processors may be configured to create a linear index, wherein the linear index includes a plurality of positions, each position of the plurality of positions defined by at least a first tier and a second tier of a plurality of tiers; assign a plurality of tasks to the plurality of positions based on task hash values associated with the plurality of tasks, wherein task hash values are generated based on at least first tier values associated with the plurality of tasks and second tier values associated with the plurality of tasks; generate a random position on the linear index, wherein the random position includes a random hash value within a range of possible hash values associated with the plurality of tiers; select, based on the random position, a populated position of the plurality of positions, wherein the populated position is assigned one or more tasks of the plurality of tasks; obtain information for the one or more tasks based on the populated position; process, based on the information, the one or more tasks.

In another example, a method may include creating, by a computing system, a linear index, wherein the linear index includes a plurality of positions, each position of the plurality of positions defined by at least a first tier and a second tier of a plurality of tiers; assigning, by the computing system, a plurality of tasks to the plurality of positions based on task hash values associated with the plurality of tasks, wherein task hash values are generated based on at least first tier values associated with the plurality of tasks and second tier values associated with the plurality of tasks; generating, by the computing system, a random position on the linear index, wherein the random position includes a random hash value within a range of possible hash values associated with the plurality of tiers; selecting, by the computing system and based on the random position, a populated position of the plurality of positions, wherein the populated position is assigned one or more tasks of the plurality of tasks; obtaining, by the computing system, information for the one or more tasks based on the populated position; processing, by the computing system and based on the information, the one or more tasks.

In yet another example, a computer-readable storage medium encoded with instructions that, when executed, causes at least one processor of a computing system to create a linear index, wherein the linear index includes a plurality of positions, each position of the plurality of positions defined by at least a first tier and a second tier of a plurality of tiers; assign a plurality of tasks to the plurality of positions based on task hash values associated with the plurality of tasks, wherein task hash values are generated based on at least first tier values associated with the plurality of tasks and second tier values associated with the plurality of tasks; generate a random position on the linear index, wherein the random position includes a random hash value within a range of possible hash values associated with the plurality of tiers; select, based on the random position, a populated position of the plurality of positions, wherein the populated position is assigned one or more tasks of the plurality of tasks; obtain information for the one or more tasks based on the populated position; process, based on the information, the one or more tasks.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

Like reference characters denote like elements throughout the text and figures.

DETAILED DESCRIPTION

Figure 1:
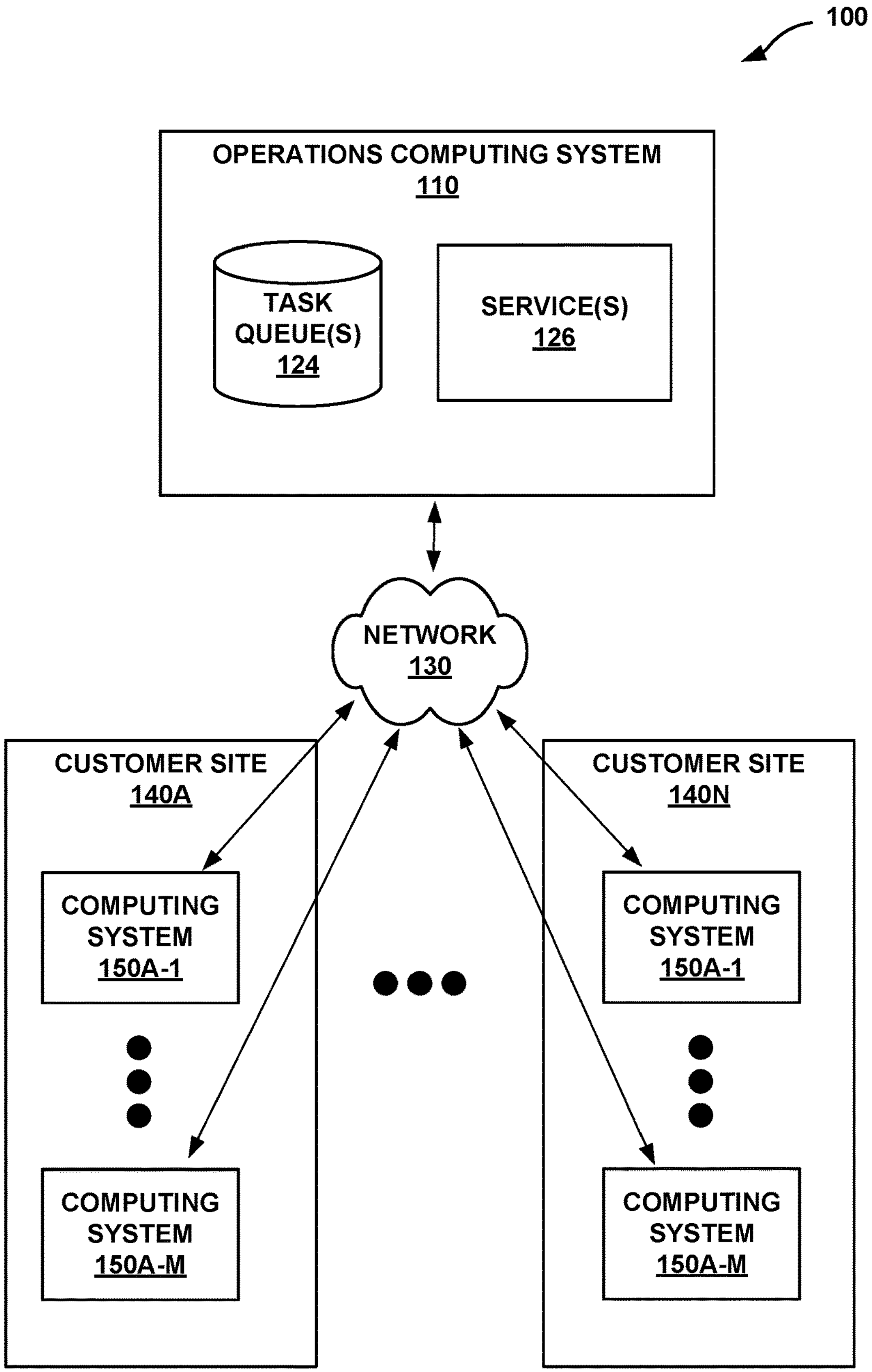
FIG. 1 is a block diagram illustrating an example system that processes queues, in accordance with the techniques of this disclosure.

FIG. 1 is a block diagram illustrating an example system 100 that processes queues. In the example of FIG. 1, system 100 may include operations computing system 110, customer sites 140A-140N (collectively referred to herein as "customer sites 140"), and network 130.

Network 130 may include any public or private communication network, such as a cellular network, Wi-Fi network, or other type of network for transmitting data between computing devices. In some examples, network 130 may represent one or more packet switched networks, such as the Internet. Operations computing system 110 and computing systems 150 of customer sites 140, for example, may send and receive data across network 130 using any suitable communication techniques. For example, operations computing system 110 and computing systems 150 may be operatively coupled to network 130 using respective network links. Network 130 may include network hubs, network switches, network routers, terrestrial and/or satellite cellular networks, etc., that are operatively inter-coupled thereby providing for the exchange of information between operations computing system 110, computing systems 150, and/or another computing device or computing system. In some examples, network links of network 130 may include Ethernet, ATM or other network connections. Such connections may include wireless and/or wired connections.

Customer sites 140 may be managed by an administrator of system 100. In some instances, customer sites 140 may include a cloud computing service, corporations, banks, retailers, non-profit organizations, or the like. Each customer site of customer sites 140 (e.g., customer site 140A and customer site 140N) may correspond to different customers, such as cloud computing services, corporations, etc.

Customer sites 140 may include computing systems 150. In some examples, computing systems 150 may represent a cloud computing system that provides one or more services via network 130. Computing systems 150 may include a collection of hardware devices, software components, and/or data stores that can be used to implement one or more applications or services related to business operations of respective customer sites 140. Computing systems 150 may represent a cloud-based implementation. In some examples computing systems 150 may include, but are not limited to, portable, mobile, or other devices, such as mobile phones (including smartphones), wearable computing devices (e.g., smart watches, smart glasses, etc.) laptop computers, desktop computers, tablet computers, smart television platforms, server computers, mainframes, infotainment systems (e.g., vehicle head units), or the like.

Operations computing system 110 may provide computer operations management services, such as a network computer. Operations computing system 110 may implement various techniques for managing data operations, networking performance, customer service, customer support, resource schedules and notification policies, event management, or the like for computing systems 150. Operations computing system 110 may be arranged to interface or integrate with one or more external systems such as telephony carriers, email systems, web services, or the like, to perform computer operations management. Operations computing system 110 may monitor and obtain various events and/or performance metrics from computing systems 150 of customer sites 140. Operations computing system 110 may be arranged to monitor the performance of computer operations of customer sites 140. For example, operations computing system 110 may be arranged to monitor whether applications or systems of customer sites 140 are operational, network performance associated with customer sites 140, trouble tickets and/or resolutions associated with customer sites 140, or the like. Operations computing system 110 may include one or more applications with computer executable instructions that transmit, receive, or otherwise process instructions and data when executed.

In the example of FIG. 1, operations computing system 110 may include, but is not limited to, remote computing systems, such as one or more desktop computers, laptop computers, mainframes, servers, cloud computing systems, etc. capable of sending information to and receiving information from computing systems 150 via a network, such as network 130. Operations computing system 110 may host (or at least provides access to) information associated with one or more applications or application services executable by computing systems 150, such as operation management client application data. In some examples, operations computing system 110 represents a cloud computing system that provides the application services via the cloud. Operations computing system 110 may include one or more tasks queues 124 (referred to herein as "task queues 124") and one or more services 126 (referred to herein as "services 126"). Services 126 may include software tools, such as software automation tools, software modules, software engines, application programming interfaces (APIs), etc. Services 126 may include computer readable instructions that, when executed by operations computing system 110, fetch and/or process tasks associated with computing systems 150. For example, services 126 may fetch and process tasks, such as generating alerts, performing actions of incident workflows, or the like. Services 126 may fetch tasks from task queues 124. Task queues 124 may include a data center, server room, computing devices, network devices, or the like for storing and/or organizing tasks associated with computing systems 150. Task queues 124 may be organized according to a database schema established by an administrator of operating computing system 110.

Task queues 124 may include a linear index (e.g., an index data structure) that includes positions defined by a multi-tier classification system. Task queues 125 may include a linear index with positions within a range of possible hash values. Task queues 125 may linearly distribute pending tasks by assigning tasks to positions based on task hash values within a defined classification hierarchy. For example, task queues 125 may assign a task to a position based on a task hash value. Task queues 125 may generate task hash values based on a first tier value associated with a customer identifier assigned to a customer site of customer sites 140 and a second tier value associated with a workflow, such as a series of processes to address an incident. In some instances, operations computing system 110 may convert each task hash value to a text representation with an encoding algorithm.

Operations computing system 110 may concatenate the task hash values with a delimiter to establish boundaries associated with portions of the task hash value corresponding to different tiers within the multi-tier classification system. In some examples, operations computing system 110 may delineate between tiers of a task hash value based on a character length associated with each tier. Operations computing system 110 may organize a task hash value in the linear index according to a hierarchy of the tiers. For example, operations computing system 110 may order a task hash value with the highest tier (e.g., a tier corresponding to the highest priority for optimizing fairness measurements) first and the lowest tier (e.g., a tier corresponding to the lowest priority for optimizing fairness measurements). Operations computing system 110 may generate task hash values with hashing algorithms (e.g., SHA256) and hash sizes based on a balance of speed and evenness of the distribution of the task hash values within the linear index.

Task queues 124 may include a linear index with positions that reference tasks associated with customer sites 140. Task queues 124 may store information for tasks including, but not limited to, diagnostic tasks, data distribution tasks, and/or service request automation tasks. Task queues 124 may store information for a set of incident response diagnostic tasks such as enriching existing events with relevant data, logging incidents (e.g., time, date, and/or status of incidents), updating the status of a platform, updating the status of a service, updating the status of third party services, restarting services, restarting servers, unlocking databases, flushing storages, clearing files from memory, adding more disk or memory space, managing tickets (e.g., opening tickets, updating tickets, closing tickets), healing, incident escalation, etc. Task queues 124 may store information for a set of data distribution tasks such as job scheduling, extract-transform-load (ETL), file transfers, data removal, complex workflows or rules, data replication, data remodeling, database creation, etc. Task queues 124 may store information for a set of service request automation tasks such as infrastructure provisioning, automatically shutting down of unused cloud resources, managing users (e.g., onboarding users, deleting users, etc.), decommissioning hardware, adding servers, adding storage, software management (e.g., updating software, deploying software, etc.), managing cloud services (e.g., provisioning cloud services), opening ports, production patching, vulnerability patching, increasing capacity, establishing security procedures, validating security, changing configurations, adding Virtual Local Area Networks (VLANs), creating communication channels, adding server hosts, establishing firewall ports, validating Secure Sockets Layer (SSL) Certificates, getting Internet Protocol (IP) addresses, regulating IP addresses, benchmark testing, etc. In some instances, task queues 124 may store information for sets of tasks associated with customer sites 140 using software application tools, modules, engines, components, etc. that may identify tasks based on actions required for management of customer sites 140. In some examples, task queues 124 may store information for tasks, such as workflow tasks. Workflow tasks may include a series of processes or actions to address an incident associated with customer sites 140. For example, task queues 124 may store information for workflow tasks, such as an end-to-end process for responding to routine service requests from customer sites 140 related to applications executing at customer sites 140.

In some examples, operations computing system 110 may include an identifier-rewrite table. For example, operations computing system 110 may include a hash-rewrite table for task hash values. Operations computing system 110 may use the hash-rewrite table to ensure that hash values associated with two different customer site identifiers are not too close in value to each other. Operations computing system 110 may generate new identifier values for customer sites in periodic intervals or in response to an event. For example, operations computing system 110 may replace one or more identifier values used to generate task hash values with one or more new identifier values after a period of time since operations computing system 110 assigned the one or more identifiers to a customer site has elapsed. In this way, operations computing system 110 may avoid placing a customer site in a dead pool or unlucky position that rarely gets selected according to the techniques of this disclosure.

Operations computing system 110 may include services 126 (e.g., incident management applications) configured to orchestrate and process tasks related to managing operations of customer computing systems (e.g., computing systems 150). Operations computing system 110 may enqueue tasks associated with managing customer computing systems in a database (e.g., tasks queues 124). Operations computing system 110 may implement conventional techniques (e.g., first-in-first-out, round-robin, etc.) to fetch and process tasks from the database. However, conventional techniques may result in computational and performance drawbacks (e.g., slow response times of addressing tasks for a customer because another customer has a high volume of tasks). Operations computing system 110 may also experience lock-contention associated with multiple services of services 126 initiating transactions (e.g., perform a write operation to lock a record specified by task queues 124) to fetch the same task from the database. The techniques described herein may include operations computing system 110 that addresses tasks in a random or pseudo-random manner to improve the quality of service provided by operations computing system 110, as well as significantly decrease risks of lock-contention.

In accordance with the techniques described herein, operations computing system 110 may manage one or more services processing tasks associated with customer sites 140 in a non-discriminatory manner. Operations computing system 110 may manage digital operations of customer sites 140. In some instances, operations computing system 110 may inequitably address tasks associated with different customer sites 140. The techniques described herein provide a non-discriminatory approach to addressing tasks associated with customer sites 140 based on a random or pseudo-random selection of tasks associated with a customer site of customer sites 140. For example, operations computing system 110 may implement a fair queueing algorithm that uses a random selection of tasks to address tasks without discriminating between customer sites 140 or based on a volume of tasks or a time a task was received. In this way, operations computing system 110 may improve fairness, measured based on resources (e.g., processing resources, memory resource, etc.).

In operation, operations computing system 110, or more specifically services 126, may generate a random position on the linear index included in task queues 124 to select one or more tasks for processing. Services 126 may generate a random position on the linear index in a random or pseudo-random manner. For example, services 126 may generate a random position with a random number generator configured to generate a random hash value within a range of possible hash values corresponding to a number or type of tiers implemented. Services 126 may use a hashing algorithm to output, for each level of the classification hierarchy (e.g., for each tier), a random hash value in a form similar to task hash values. For example, services 126 may generate a random hash value with the same hashing algorithm used to generate task hash values. Services 126 may generate random bytes of the same length with the same hashing algorithm used to create positions on the linear index. Services 126 may apply any method for generating random bits, such as a weakly pseudo-random method. Services 126 may convert random hash values to text with the same encoding algorithm applied to task hash values. Services 126 may concatenate the random hash value using the same delimiter, or similar technique (e.g., delineating between tiers based on a length of segments associated with the random hash value).

Operations computing system 110, or more specifically services 126, may select, based on the random position, a populated position on the linear index. Services 126 may select a populated position by comparing the random hash value included in the random position to a task hash value that may be included in a corresponding position on the linear index. For example, services 126 may determine that the random hash value of the random position matches a task hash value of a corresponding position on the linear index. In instances when a service of services 126 determines the random position corresponds to a populated position assigned to one or more tasks (e.g., includes a task hash value), the service may obtain from task queues 124, information for the one or more tasks (e.g., a reference to instructions to process the one or more task) associated with the customer site of customer sites 140 corresponding to the matching identifier values. Services 126 may query information for the one or more tasks from task queues 124. Services 126 may process the task based on the information obtained from task queues 124. For example, services 126 may obtain information for the task specifying a reference location services 126 may obtain instructions to process the task. Services 126 may process the task by requesting computer-readable instructions to perform the task based on the information obtained from task queues 124. In some instances, services 126 may obtain information for the one or more tasks, such as timestamps indicating when the one or more tasks were received. Services 126 may select the oldest task of the one or more tasks based on the timestamps of the one or more tasks included in the information. Services 126 may process the oldest task based on the populated position and instructions associated with the oldest task included in the information. In this way, services 126 may process the one or more tasks in order from oldest to newest without an additional query. Services 126 may process the one or more tasks in order based on a compound index on the task hash string (e.g., generated by converting a task hash value using an encoding algorithm) and enqueue timestamps included in the information obtained for the one or more tasks.

Operations computing system 110, or more specifically services 126 may determine a random hash value associated with a random position does not match at least one task hash value associated with a plurality of tasks. Services 126 may find a populated position on the linear index by determining the populated position is nearest to the random position. Services 126 may select the populated position by finding a nearest position to the random position on the linear index. In some instances, services 126 may generate modified random positions on the linear index. Services 126 may generate a modified random position on the linear index in instances when services 126 determines the initially generated random position does not correspond to a populated position. For example, in instances when services 126 determines the random hash value of the random position does not match at least one position on the linear index that includes a task hash value, services 126 may generate a modified random position with a modified random hash value by incrementing or decrementing the original random hash value (e.g., move right or move left on the linear index). Services 126 may keep generating modified random positions until a populated position is found (e.g., a modified random hash value matches a task hash value). Services 126 may generate the modified random position by finding the nearest populated position on the linear index corresponding to a task hash value associated with one or more tasks stored in task queues 124. Services 126 may determine whether the modified random position crossed a tier boundary by checking whether the modified random position includes one or more different tier hash values (e.g., a different tier two value) compared to the original random position. Services 126 may select a task record with the largest hash value less than the original random hash value (e.g., if moving left on the linear index). Services 126 may select a task record with the smallest hash value less than the original random hash (e.g., if moving right on the linear index).

Services 126 may perform a write operation to lock the record corresponding to the selected one or more tasks. Services 126 may perform a write operation to lock the record corresponding to the one or more tasks such that other services may not select the same record when attempting to obtain information for a task. In instances when a service of services 126 selects a task record that has already been locked, the service may generate another random position and repeat the same process as previously discussed.

Services 126 may obtain information for the task associated with customer sites 140 based on the selected populated position. For example, services 126 may use the task hash value of the populated position to query information of corresponding tasks stored at task queues 124. Services 126 may obtain information for one or more tasks, such as incident response processes, actions, or workflows for addressing the task. In some instances, services 126 may apply the information to process one or more tasks in order based on an enqueue timestamp associated with the tasks. In some examples, services 126 may apply the information to obtain instructions to process the one or more tasks from one or more engines or applications managed by operations computing system 110. Services 126 may include services that are designed to handle tasks of the same like. Services 126 may include specialized services that are managed and receive instructions from one or more applications implemented by operations computing system 110.

The techniques described herein may provide one or more technical advantages that realize one or more practical applications. For example, operations computing system 110 may ensure fairness when addressing tasks received from computing systems 150 of customer sites 140, no matter the volume or time tasks are submitted by computing systems 150 of customer sites 140. An operations computing system may implement complex models (e.g., machine learning models) to fairly address tasks; however, implementing complex models may utilize an excessive amount of processing and/or memory resources. By addressing tasks in a random or pseudo-random manner with computationally inexpensive hash values, operations computing system 110 may minimize computational and performance drawbacks associated with addressing tasks from customers based on a number of tasks submitted by computing system 150 or a time computing system 150 submits tasks.

In addition, operations computing system 110 may minimize instances of lock-contention associated with services 126 attempting to address the same task or customer's task from tasks queues 124. For example, a first service may address tasks by performing a write-operation to the database to lock the task or customer task list such that a second service may not pull or fetch the same task or customer task list associated with the task or customer task list the first service is going to address. Lock-contention often results when services attempt to address tasks or customer task lists with customary techniques, such as services attempting to address tasks at the top of a task queue in a first-in-first-out or round-robin manner. Operations computing system 110, as described herein, may instruct services 126 to randomly or pseudo-randomly select or address tasks or customer task lists, which may minimize lock-contention associated with services locking a task or customer task list. In this way, operations computing system 110 may implement techniques that support a more scalable approach of multiple services addressing a high volume of tasks from various customers, in parallel, while minimizing or reducing computational and performance drawbacks.

Figure 2:
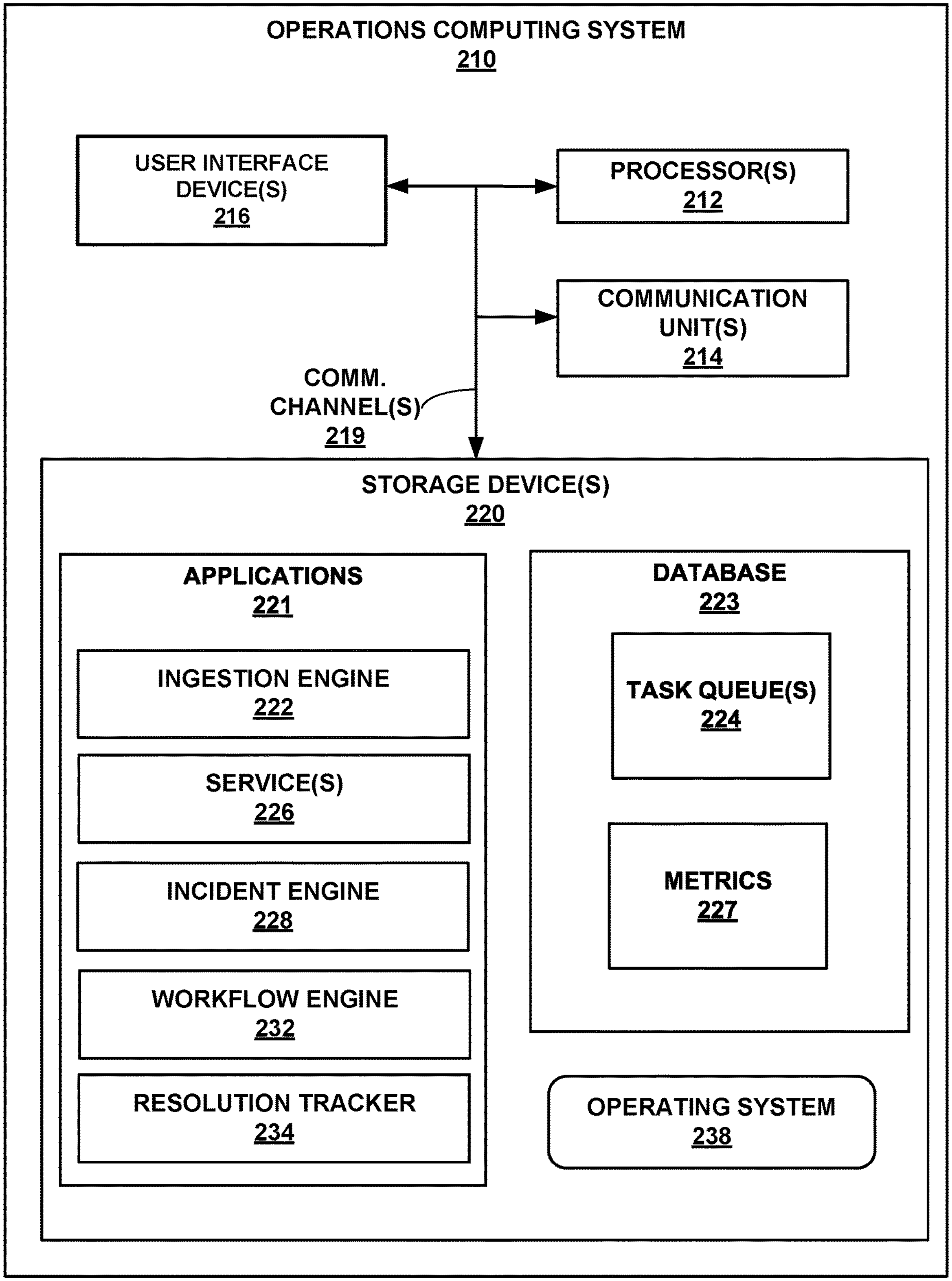
FIG. 2 is a block diagram illustrating an example computing system for managing tasks, in accordance with one or more techniques of this disclosure.

FIG. 2 is a block diagram illustrating example operations computing system 210 for managing tasks, in accordance with one or more techniques of this disclosure. Operations computing system 210 may be an example implementation of operations computing system 110 of FIG. 1. In the example of FIG. 2, tasks queues 224 and services 226 may correspond to tasks queues 124 and services 126 of FIG. 1, respectively.

Computing system 210, in the example of FIG. 2, may include user interface (UI) devices 216, processors 212, communication units 214, and storage devices 220. Communication channels 219 ("COMM channel(s) 219") may interconnect each of components 212, 214, 216, and 220 for inter-component communications (physically, communicatively, and/or operatively). In some examples, communication channel 219 may include a system bus, a network connection, an inter-process communication data structure, or any other method for communicating data.

UI devices 216 may be configured to function as an input device and/or an output device for operations computing system 210. UI device 216 may be implemented using various technologies. For instance, UI device 216 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 216 may include a presence-sensitive device that may receive tactile input from a user of operations computing system 210.

UI device 216 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, miniLED, microLED, organic light-emitting diode (OLED) display, e-ink, or similar monochrome or color display capable of outputting visible information to a user of operations computing system 210. Additional examples of an output device include a speaker, a haptic device, or other device that can generate intelligible output to a user. For instance, UI device 216 may present output as a graphical user interface that may be associated with functionality provided by operations computing system 210.

Processors 212 may implement functionality and/or execute instructions within operations computing system 210. For example, processors 212 may receive and execute instructions that provide the functionality of applications 221 and OS 238. These instructions executed by processors 212 may cause operations computing system 210 to store and/or modify information within storage devices 220 or processors 212 during program execution. Processors 212 may execute instructions of applications 221 and OS 238 to perform one or more operations. That is applications 221 and OS 238 may be operable by processors 212 to perform various functions described herein.

Storage devices 220 may store information for processing during operation of operations computing system 210 (e.g., operations computing system 210 may store data accessed by applications 221 and OS 238 during execution). In some examples, storage devices 220 may be a temporary memory, meaning that a primary purpose of storage devices 220 is not long-term storage. Storage devices 220 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 220 may include one or more computer-readable storage media. Storage devices 220 may be configured to store larger amounts of information than volatile memory. Storage devices 220 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 220 may store program instructions and/or information (e.g., within database 223) associated with applications 221 and OS 238.

Communication unit 214 may communicate with one or more external devices via one or more wired and/or wireless networks by transmitting and/or receiving network signals on the one or more networks. Examples of communication units 214 include a network interface card (e.g., such as an Ethernet card), an optical transceiver, a radio frequency transceiver, a GNSS receiver, or any other type of device that can send and/or receive information. Other examples of communication unit 214 may include short wave radios, cellular data radios (for terrestrial and/or satellite cellular networks), wireless network radios, as well as universal serial bus (USB) controllers.

OS 238 may control the operation of components of operations computing system 210. For example, OS 238 may facilitate the communication of applications 221 with processors 212, storage devices 220, and communication units 214. OS 238 may have a kernel that facilitates interactions with underlying hardware of operations computing system 210 and provides a fully formed application space capable of executing a wide variety of software applications having secure partitions in which each of the software applications executes to perform various operations.

Applications 221 may include application engines such as ingestion engine 222, services 226, incident engine 228, workflow engine 232, and resolution tracker 234. Ingestion engine 222 may be arranged to receive and/or obtain one or more different types of operations events provided by various sources. Ingestion engine 222 may obtain operations events that include alerts regarding system errors, warnings, failure reports, customer service requests, status messages, or the like. Ingestion engine 222 may be configured to obtain operations events that may be variously formatted messages that reflect the occurrence of events and/or incidents that have occurred in an organization's computing system (e.g., computing systems 150 of FIG. 1). Ingestion engine 222 may obtain operations events that may include SMS messages, HTTP requests or posts, API calls, log file entries, trouble tickets, emails, or the like. Ingestion engine 222 may obtain operations events that may be associated with one or more service teams that may be responsible for resolving issues related to the operations events. In some examples, ingestion engine 222 may obtain operations events from one or more external services that are configured to collect operations events.

Ingestion engine 222 may be configured to orchestrate various actions related to the obtained operations events. Ingestion engine 222 may employ (e.g., generate computer-readable instructions, configure, etc.) one or more services of services 226 to perform the actions related to operations events. For example, ingestion engine 222 may employ services 226 to filter operations events, reformat operations events, extract information from the operations events, or normalize data of the operations events. Ingestion engine 222 may employ services 226 to perform actions related to operations events based on information of the operations events stored in task queues 224 for eventual processing by one or more services of services 226.

Services 226 may include one or more software components configured to generate computer-readable instructions, one or more microservices, computing devices, computing systems, or other pieces of computing infrastructure. Services 226 may be operated, managed, monitored, and configured by one or more teams associated with operations computing system 210. Services 226 may be employed by applications of applications 221 to process tasks (e.g., workflow tasks) generated by any of applications 221. In some instances, services of services 226 may assign tasks to other services of services 226.

Incident engine 228 may be configured to orchestrate various actions related to analyzing operations events. For example, incident engine 228 may determine tasks related to actions of alerting services 226 or teams of operations computing system 210 of an operations event. Incident engine 228 may determine tasks related to classifying operations events based on severity (e.g., critical, error, warning, information, unknown, etc.). Incident engine 228 may determine tasks related to outputting the severity of operations events to services 226 or teams of operations computing system 210. Incident engine 228 may determine tasks related to determining a time frame or urgency for addressing an incident. Incident engine 228 may determine tasks related to notifying relevant computing systems of incidents. Incident engine 228 may determine tasks related to prioritizing incidents for eventual processing. Incident engine 228 may determine tasks related to identifying workflows or templates of actions that may be used to resolve certain incidents in an automated way.

Workflow engine 232 may be configured to orchestrate various actions related to workflows for addressing incidents. For example, workflow engine 232 may determine tasks related to jobs or processes of executing scripts, commands, or plugins that address incidents. Workflow engine 232 may determine tasks related to runbooks or a compilation of routine operating procedures for managing computing systems 150. Workflow engine 232 may map incidents to one or more workflows that may be executed to resolve at least part of an incident.

Resolution tracker 234 may be configured to monitor details related to the status of operations events obtained by operations computing system 210. For example, resolution tracker 234 may be configured to monitor incident life-cycle metrics associated with operations events (e.g., creation time, acknowledgement time(s), resolution time, etc.), resources responsible for resolving the events (e.g., applications 221), and so on. Resolution tracker 234 may store data obtained from monitoring the details related to the status of operations events in database 223 for compilation by metrics 227.

Applications 221 may determine tasks associated with customers managed by operations computing system 210. In some instances, services of services 226 may determine tasks to be processed by other services of services 226. In some instances, engines 222, 228, and 232 may determine tasks to be processed by services of services 226. For example, ingestion engine 222 of applications 221 may determine tasks associated with ingesting operations events associated with customer computing systems. Incident engine 228 may determine tasks associated with determining incidents, classifying incidents, and/or notifying teams about incidents. Workflow engine 232 may determine tasks associated with templates of actions to resolve incidents. Applications 221 may store information of determined tasks in task queues 224, such as how to process the task or where to request instructions for processing the task.

Services 226 may be employed by an application of applications 221 to process tasks based on information for the tasks stored in task queues 224. For example, a service of services 226 may apply information for a task (e.g., a reference or address specifying a location where instructions for the task are maintained) to obtain instructions from ingestion engine 222 to perform actions related to operations events. A service of services 226 may apply information for a task to obtain instructions from incident engine 228 to perform actions related to determining incidents, classifying incidents, and/or notifying teams about incidents. A service of services 226 may apply information for a task to obtain instructions from workflow engine 232 to perform actions related to resolving incidents.

Database 223 may include tasks queues 224 and metrics 227. Metrics 227 may be configured to process the data related to the status of operations events into operations metrics. Metrics 227 may be configured to compute operations metrics such as mean-time-to-acknowledge (MTTA), mean-time-to-resolve (MTTR), incident count per resolvers, resolution escalations, uniqueness of events, auto-resolve rate, time-of-day of incidents, adjusting for multiplier events per single incident, service dependencies, infrastructure topology, or the like. In some instances operations computing system 210 may replace identifier values of an tier hash values of allowable hash values of a position on the linear index with new tier hash values based on metrics 227. For example, if a customer site is associated with degraded metrics 227 (e.g., slow MTTA or MTTR) operations computing system 210 may assign new tier hash values to customer sites in order to improve metrics 227 corresponding to the customer site.

In accordance with the techniques described herein, operations computing system 210 may process tasks for customers in a non-discriminatory manner. Applications 221 may assign tier values to customer sites associated with information for tasks stored with task queues 224. Tasks queues 224 may store information for tasks related to the managing of customer computing systems (e.g., computing system 150 of FIG. 1). Task queues 224 may include a linear index with positions referencing records of task information associated with customer sites. In some examples, task queues 224 may index records of task information based on task hash values generated based on tier values, such as a customer site identifier value, a workflow identifier value, an incident identifier value, and/or an event identifier value. Services 226 may be configured to non-discriminatorily address tasks by implementing a fair queuing algorithm that includes generating random positions within a linear index.

Services 226 may generate a random position within a range of possible hash values associated with the plurality of tiers. Services 226 may generate a random position to include a random hash value with the same format (e.g., hashing scheme, data structure, or other type of identifier convention) as task hash values. In some instances, services 226 may generate a random position with the same format as positions of the linear index determined based on tiered identifier values (e.g., a tuple including a customer site identifier, a workflow identifier, an incident identifier, and/or an event identifier).

Services 226 may select, based on the random position, a populated position on the linear index maintained by task queues 224. For example, services 226 may select a populated position by determining whether one or more random hash values associated with the randomly generated position match the one or more task hash values of a position on the linear index. In examples where the random hash value of a random position does not match at least one task hash value, services 226 may increment or decrement the random hash value to generate a modified random hash value of a modified random position on the linear index. Services 226 may generate one or more modified positions until there is a match between a task hash value and the random or modified hash value.

In some instances, services 226 may select a populated position by determining whether a record corresponding to the randomly generated position exists and that the record is unlocked. In examples where services 226 determines there are no records corresponding to the randomly generated position, services 226 may modify the randomly generated hash value of the random position until services 226 determines there is a record that corresponds to the modified hash value. In example where services 226 determines the record is locked (e.g., lock contention), services 226 may generate a new random position to select a new populated position associated with records specifying one or more tasks.

In examples where services 226 determines the record with the set of one or more tasks is locked (e.g., lock contention) or services 226 determines there is no record corresponding to the selected populated position (e.g., a position on the linear index with a delineated task hash values associated with a customer site identifier, workflow identifier, and/or incident identifier, services 226 may generate new random hash value to select a new combination of customer site identifiers, workflow identifiers, and/or incident identifiers. In some examples, services 226 may be configured to obtain instructions from any one of engines 222, 228, 232 based on information obtained from task queues 224 using the selected populated position. Services 226 may process the instructions by performing actions specified in the task referenced by the selected populated position.

Figure 3:
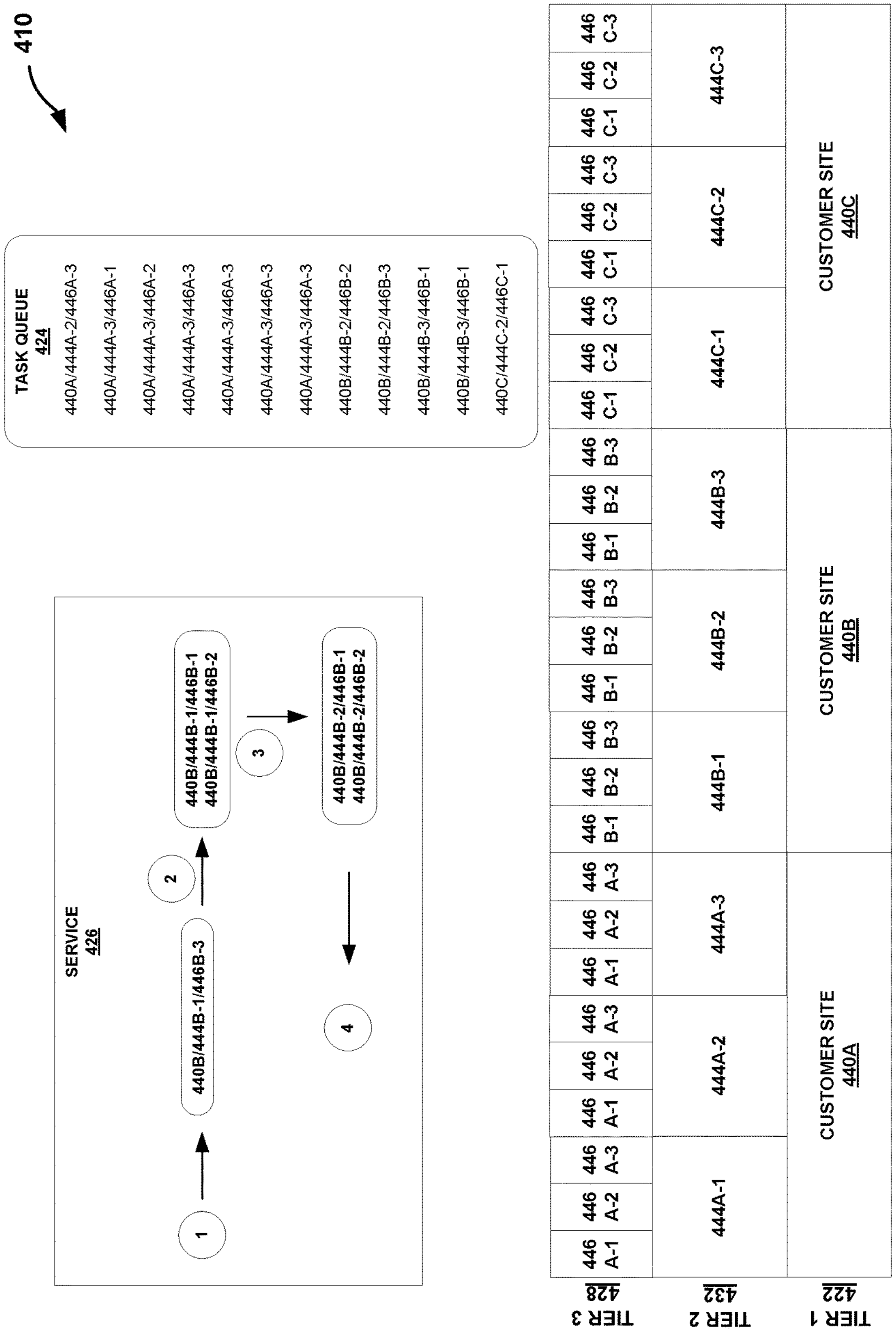
FIG. 3 is a conceptual diagram illustrating an example process of traversing tiers of tasks, in accordance with techniques of this disclosure.

FIG. 3 is a conceptual diagram illustrating an example process of traversing tiers of tasks, in accordance with techniques of this disclosure. FIG. 3 is discussed with respect to FIGS. 1-2 for example purposes only. In the example of FIG. 3, operations computing system 410, service 426 and task queue 424 may be example implementations of operations computing system 110, services 126 and task queues 124 of FIG. 1, respectively.

In some examples, operations computing system 410 may determine which customer site to address tasks for based on one tier associated with a customer or account identifier. However, operations computing system 410 may continue to have computational and performance drawbacks by determining tasks to process based on one identifier. For example, operations computing system 410 may select customer site 140A to process tasks for. In this example, computing system 150A-1 may be associated with a high volume of tasks while computing system 150A-M may be associated with a low volume of tasks that were submitted after the tasks associated with computing system 150A-1. Operations computing system 410 may be delayed in addressing tasks associated with computing system 150A-M (e.g., unfairly address tasks associated with computing system 150A-M), despite some of those tasks being of higher priority than some tasks associated with computing system 150A-1. The techniques described herein may implement two or more tiers to improve the quality of service (e.g., improve efficiency and fairness measures of services addressing tasks) provided by operations computing system 410.

Computing system 410 may create a linear index with a plurality of positions defined by a tier 1 422, tier 2 432, and tier 3 428. Computing system 410 may generate the linear index to linearly distribute information for tasks stored at task queues 124 for fast and efficient random selection of tasks. Computing system 410 may establish a first tier (e.g., tier 1 422) corresponding to customer sites (e.g., customer sites 140 of FIG. 1) managed by computing system 410. Computing system 410 may establish any number of tiers based on the application orchestrating the processing of particular tasks. For example, computing system 410 may establish a second tier (e.g., tier 2 432) for workflow engine 332 that corresponds to workflows that may include templates of processes or actions service 426B may take to address an incident. Computing system 410 may establish a third tier (e.g., tier 3 428) corresponding to incidents associated with a customer site (e.g., customer sites 140). In general, computing system 410 may establish tiers based on criteria or priorities specific to the application responsible for orchestrating the processing of tasks. In some examples, computing system 410 may establish tiers based on criteria or priorities specific to particular customer sites.

Computing system 410 may hash and concatenate layers of a task into tier identifier values when generating task hash values used to query information for tasks stored at task queues 424. For example, computing system 410 may generate a task hash value to point to information for a task for Customer A that includes workflow A used to address incident A. In this example, computing system 410 may hash and concatenate identifier values for each tier into a tier identifier value of “4DF-A03-62A,” where ‘4DF’ is a customer identifier value for Customer A, ‘A03’ is a workflow identifier for Workflow A, '62A' is an incident identifier value for incident A, and "-" is used as a delimiter. Computing system 410 may maintain positions on a linear index as one or more index data structures for querying information for tasks stored at task queues 424 based on a range of possible hash values associated with tiers 422, 432, and 428. In other words, computing system 410 may index information for tasks in task queues 424 based on position hash values and task hash values used to assign tasks to a position on the linear index.

In some examples, computing system 410 may prioritize tasks. Computing system 410 may prioritize tasks (e.g., interactive requests) because the prioritized tasks should be processed as soon as possible due to time sensitivity. Computing system 410 may hash information for prioritized tasks by assigning a special hash value to one or more tiers associated with the task. Computing system 410 may be configured to identify information for these specially hashed tasks and process the tasks prior to generating random positions. For example, service 426 may fetch or dequeue a prioritized task by first checking whether a customer site identifier value, for example, is associated with any priority hash values assigned to other tiers.

In accordance with the techniques described herein, service 426 may select a populated position pointing to a set of one or more tasks from task queues 424 to fetch. Service 426 may select the populated position based on a random position including random hash values corresponding to each tier. At step 1, service 426 may generate a random position to include random tier hash values. For example, service 426 may generate a random position of "440B/444B-1/446B-3," wherein a first random string hash value of the random position is 440B, a second random string hash value of the random position is 444B-1, and a third random string hash value of the random position is 446B-3. At step 2, service 426 determines whether the generated random position matches a populated position. For example, service 426 may determine a random hash value of the random position matches a task hash value associated with a populated position corresponding to information for a task stored in task queues 424. In response to service 426 determining that the generated random position matches a populated position, service 426 may fetch information for the task associated with the populated position to perform the task. In response to service 426 determining the generated random position does not match a populated position, as illustrated in the example of FIG. 3, service 426 may increment or decrement random hash values of the random position to generate modified random hash values. For example, service 426 may generate modified hash values of "440B/444B-1/446B-1" and "440B/444B-1/446B-2" by changing one or more delineated portions of the random hash value. Service 426 may proceed to step 3 with the modified hash values.

At step 3, service 426 may cross a tier boundary in response to generating modified hash values for all string hash values within a tier. For example, service 426 may generate the modified hash value of "440B/444B-1/446B-1" and "440B/444B-1/446B-2," which are not identifiers associated with information for tasks stored in task queues 424. Service 426 may cross the tier boundary between tier 3 428 and tier 2 432 and generate a second set of modified hash values by incrementing or decrementing identifier values corresponding to tier 2 432. For example, service 426 may generate modified hash values of "440B/444B-2/446B-1" and/or "440B/444B-2/446B-2" until there is a match with a task hash value associated with information for tasks stored in task queues 424.

At step 4, service 426 determines the modified hash value matches a task hash value associated with information for tasks stored in task queues 424. For example, service 426 may determine the modified random hash value of "440B/444B-2/446B-1" matches a populated position with a task hash value of "440B/444B-2/446B-1" corresponding to information for a task stored in task queues 424. Service 426 may select the populated position based on the modified random position. Service 426 may fetch information for the task based on the selected populated position. Service 426 may process the task based on information for the task obtained from task queues 424. Service 426 may process tasks specified by the populated position based on information for the task specifying instructions to process the task may be obtained from other applications or teams of operations computing system 410.

Figure 4:
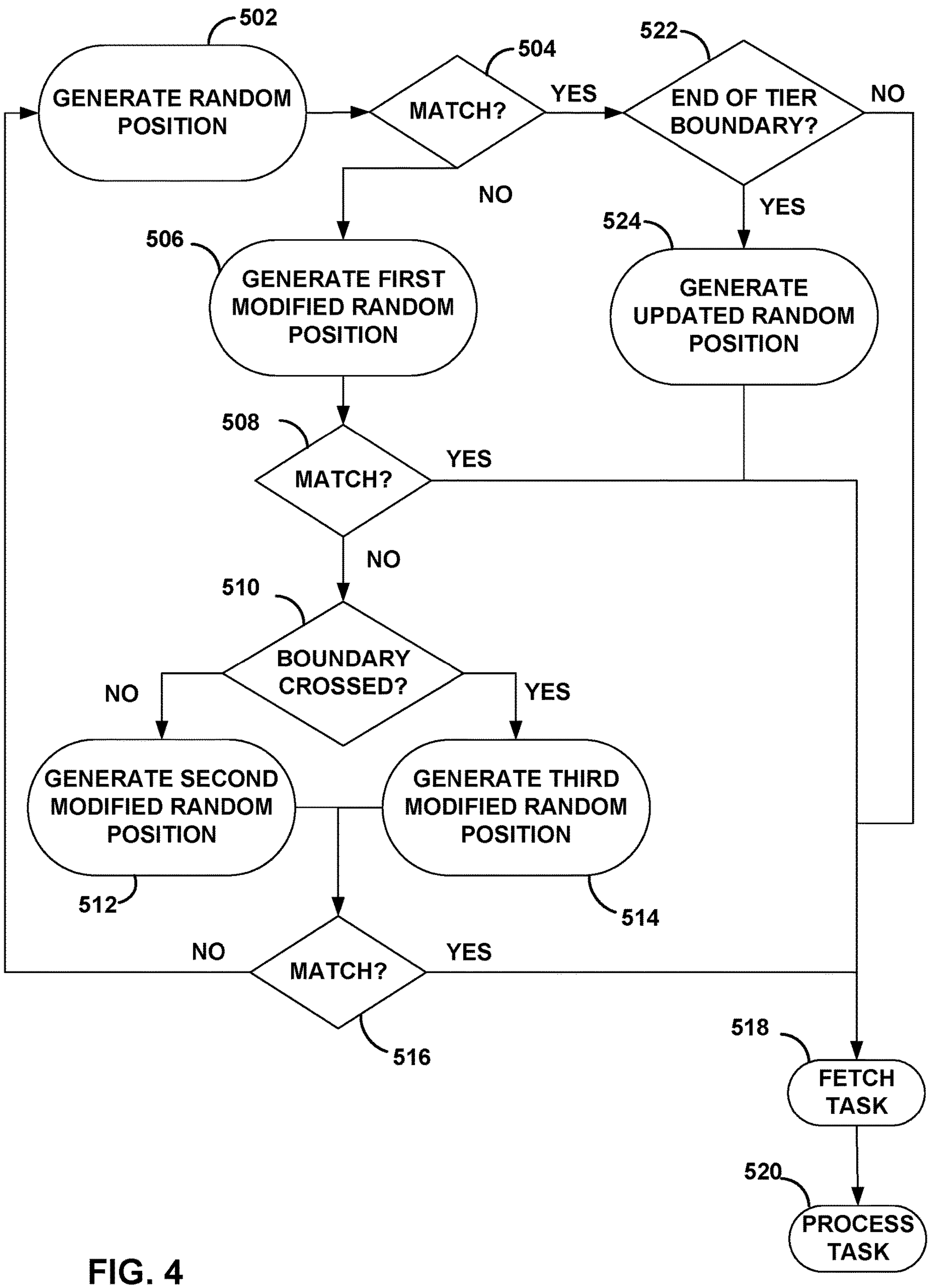
FIG. 4 is a flow chart illustrating an example process of traversing tiers of tasks, in accordance with one or more aspects of the present disclosure.

FIG. 4 is a flow chart illustrating an example process of traversing tiers of tasks, in accordance with one or more aspects of the present disclosure. FIG. 4 is discussed with respect to FIGS. 1-3 for example purposes only. Workflow engine 332 of computing system 310 may configure service 426 to process tasks based on tiered hash values. In the example of FIG. 4, service 426 may generate a random position on a linear index (502). For example, services 426 may generate a random position with a random hash value in the form of "Customer ID-Workflow ID-Incident ID" that corresponds to a task hash value including hashed and concatenated version of a customer identifier, a workflow identifier, and an incident identifier. Services 426 may determine whether the generated random task value matches a task hash value associated with information for a task (504). In response to determining that the random task value matches a task hash value, service 426 may determine whether the random position is at the end of a tier boundary (YES branch 504) (522). Service 426 may determine whether a position is at the end of the tier boundary by finding a position proceeding (e.g., to the right of) the random position of step 502 and determining whether the proceeding position crosses a tier boundary. In response to service 426 determining the random position is not at the end of a tier boundary, service 426 may fetch information for a set of one or more tasks based on the matching task hash value (NO branch 522) (518). Service 426 may process the set of one or more tasks based on the information for the set of one or more tasks obtained from task queues 424 (520).

In response to determining the random position is at the end of a tier boundary, service 426 may generate an updated random position (YES branch 522) (524). Service 426 may generate an updated random position by retrying from the start of the current tier. Service 426 may retry from the current tier by generating a modified random hash value for just a current tier level. Service 426 may move right or left to find the nearest populated position. For example, service 426 may generate a random position including a random hash value of "440B/444B-2/446B-3" corresponding to a position of the linear index of FIG. 3. Service 236C may determine that "440B/444B-2/446B-3" is at the end of the tier boundary of tier 3 429. In this example, service 426 may generate an updated random position to include a modified random hash value of "440B/444B-2/446B-2" as the lowest tier value within tier 3 428. Service 426 may fetch the information for a set of one or more tasks based on the updated tiered identifier value (518) (YES branch 522). Service 426 may process the set of one or more tasks based on the information for the set of one or more tasks obtained from task queues 424 (520).

In response to service 426 determining the random hash value of a random position does not match a task hash value associated with a populated position, service 426 may generate a first modified random position (506) (NO branch 504). Service 426 may generate a first modified random position that may randomly alter the random hash value included in the original random position of step 502. For example, service 426 may generate a first modified random that alters the incident identifier portion of the random hash value of the original random position. Service 426 may determine whether the first modified random hash value matches a task hash value of a populated position (508). In response to service 426 determining the first modified random hash value does match a task hash value of a populated position, service 426 may fetch the information for the task associated with the matching task hash value (518) (YES branch 508). Service 426 may then process the task based on the information for the task (520).

In response to service 426 determining the first modified random hash value does not match a task hash value, service 426 may determine whether service 426 may have to cross a tier boundary (510) (NO branch 508). Service 426 may determine a tier boundary has been crossed if modified random hash values of the first modified random position have at least two different hash values for different tiers. In response to determining a tier boundary will not have to be crossed, service 426 may generate a second modified random position that alters the first modified random position based on the same tier identifier that was altered when generating the first modified random position (512) (NO branch 510). In response to determining that a tier boundary will be crossed, service 426 may generate a third modified random position that alters the first modified random position based on a tier hash value that was not altered for the first modified random position (514) (YES branch 510). For example, service 426 may generate the third modified random position by crossing the incident tier boundary, to alter the hash value of the tiered identifier value associated with the workflow tier.

Service 426 may determine whether the second modified random position or the third modified random position match a populated position (516). In response to determining that either the second modified random position or the third modified random position matches a populated position, service 426 may fetch the information for the task from task queues 424 (518) (YES branch 516). Service 426 may process the fetched task based on the information for the task (520). In response to service 426 determining that neither the second modified random position or the third modified random position match a populated position, service 426 may generate a new random position and repeat steps 502-524 until a match is found (502) (NO branch 516). In some instances, service 426 may generate more modified random positions until there is a match between a modified random position and a populated position.

Figure 5:
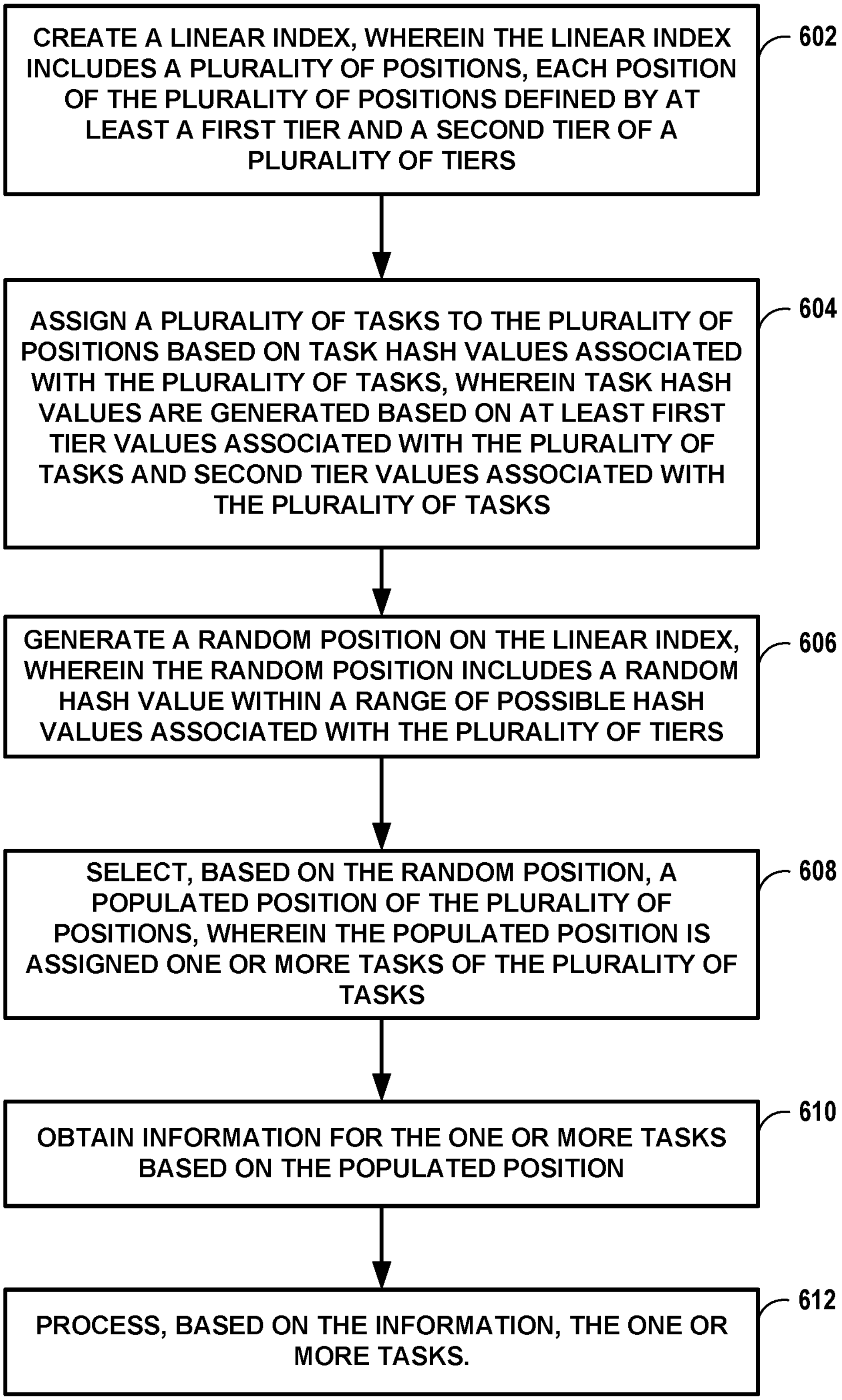
FIG. 5 is a flow chart illustrating an example process to process queues, in accordance with one or more aspects of the present disclosure.

FIG. 5 is a flow chart illustrating an example process to process queues, in accordance with one or more aspects of the present disclosure. FIG. 5 is discussed with respect to FIGS. 1-3 for example purposes only.

Operations computing system 110 may create a linear index, wherein the linear index includes a plurality of positions, each position of the plurality of positions defined by at least a first tier and a second tier (602). Operations computing system 110 may assign a plurality of tasks to the plurality of positions based on task hash values associated with the plurality of tasks, wherein task hash values are generated based on at least first tier values associated with the plurality of tasks and second tier values associated with the plurality of tasks (604).

Operations computing system 110 may generate a random position on the linear index, wherein the random position includes a random hash value within a range of possible hash values associated with the plurality of tiers (606). Operations computing system 110 may select, based on the random position, a populated position of the plurality of positions, wherein the populated position is assigned one or more tasks of the plurality of tasks (608). Operations computing system 110 may obtain information for the one or more tasks based on the populated position (610). Operations computing system 110 may process, based on the information, the one or more tasks (612).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

creating, by a computing system, a linear index, wherein the linear index includes a plurality of positions, each position of the plurality of positions defined by at least a first tier and a second tier of a plurality of tiers;

assigning, by the computing system, a plurality of tasks to the plurality of positions based on task hash values associated with the plurality of tasks, wherein the task hash values are generated based on at least first tier values associated with the plurality of tasks and second tier values associated with the plurality of tasks;

generating, by the computing system, a random position on the linear index, wherein the random position includes a random hash value within a range of possible hash values associated with the plurality of tiers;

selecting, by the computing system and based on the random position, a populated position of the plurality of positions, wherein the populated position is assigned one or more tasks of the plurality of tasks;

obtaining, by the computing system, information for the one or more tasks based on the populated position; and processing, by the computing system and based on the information, the one or more tasks.

2. The method of claim 1, wherein selecting the populated position comprises:

determining the random hash value matches a task hash value associated with the one or more tasks.

3. The method of claim 1, wherein selecting the populated position comprises:

determining the random hash value does not match at least one task hash value associated with the plurality of tasks;

generating a modified random position on the linear index, wherein the modified random position includes a modified random hash value; and selecting the populated position based on determining the modified random hash value matches a task hash value associated with the one or more tasks.

4. The method of claim 1, further comprising:

determining the random hash value does not match at least one task hash value associated with the plurality of tasks; and selecting the populated position by finding a nearest position to the random position on the linear index.

5. The method of claim 1, wherein each position is defined by a first tier, a second tier, and a third tier, and wherein assigning the plurality of tasks to the plurality of positions comprises:

determining a first tier value, a second tier value, and a third tier value associated with a task of the plurality of tasks;

generating a task hash value for the task based on the first tier value, the second tier value, and the third tier value; and assigning the task to a position of the plurality of positions based on the task hash value.

6. The method of claim 1, wherein obtaining the information for the one or more tasks comprises:

querying the one or more tasks from a database.

7. The method of claim 1, wherein processing the one or more tasks comprises:

selecting an oldest task of the one or more tasks based on timestamps of the one or more tasks included in the information; and processing the oldest task based on the populated position and instructions associated with the oldest task included in the information.

8. The method of claim 1, wherein the first tier is associated with a customer and the second tier is associated with a workflow.

9. A system comprising one or more processors having access to a memory, the one or more processors configured to:

create a linear index, wherein the linear index includes a plurality of positions, each position of the plurality of positions defined by at least a first tier and a second tier of a plurality of tiers;

assign a plurality of tasks to the plurality of positions based on task hash values associated with the plurality of tasks, wherein the task hash values are generated based on at least first tier values associated with the plurality of tasks and second tier values associated with the plurality of tasks;

generate a random position on the linear index, wherein the random position includes a random hash value within a range of possible hash values associated with the plurality of tiers;

select, based on the random position, a populated position of the plurality of positions, wherein the populated position is assigned one or more tasks of the plurality of tasks;

obtain information for the one or more tasks based on the populated position; and process, based on the information, the one or more tasks.

10. The system of claim 9, wherein to select the populated position, the one or more processors are configured to:

determine the random hash value matches a task hash value associated with the one or more tasks.

11. The system of claim 9, wherein to select the populated position, the one or more processors are configured to:

determine the random hash value does not match at least one task hash value associated with the plurality of tasks;

generate a modified random position on the linear index, wherein the modified random position includes a modified random hash value; and select the populated position based on determining the modified random hash value matches a task hash value associated with the one or more tasks.

12. The system of claim 9, wherein the one or more processors are further configured to:

determine the random hash value does not match at least one task hash value associated with the plurality of tasks; and select the populated position by finding a nearest position to the random position on the linear index.

13. The system of claim 9, wherein the each position is defined by a first tier, a second tier, and a third tier, and wherein to assign the plurality of tasks to the plurality of positions, the one or more processors are configured to:

determine a first tier value, a second tier value, and a third tier value associated with a task of the plurality of tasks;

generate a task hash value for the task based on the first tier value, the second tier value, and the third tier value; and assign the task to a position of the plurality of positions based on the task hash value.

14. The system of claim 9, wherein to obtain the information for the one or more tasks, the one or more processors are configured to:

query the one or more tasks from a database.

15. The system of claim 9, wherein to process the one or more tasks, the one or more processors are configured to:

select an oldest task of the one or more tasks based on timestamps of the one or more tasks included in the information; and process the oldest task based on the populated position and instructions associated with the oldest task included in the information.

16. The system of claim 9, wherein the first tier is associated with a customer and the second tier is associated with a workflow.

17. A computer-readable storage medium encoded with instructions that, when executed, cause at least one processor of a computing system to:

create a linear index, wherein the linear index includes a plurality of positions, each position of the plurality of positions defined by at least a first tier and a second tier of a plurality of tiers;

assign a plurality of tasks to the plurality of positions based on task hash values associated with the plurality of tasks, wherein the task hash values are generated based on at least first tier values associated with the plurality of tasks and second tier values associated with the plurality of tasks;

generate a random position on the linear index, wherein the random position includes a random hash value within a range of possible hash values associated with the plurality of tiers;

select, based on the random position, a populated position of the plurality of positions, wherein the populated position is assigned one or more tasks of the plurality of tasks;

obtain information for the one or more tasks based on the populated position; and process, based on the information, the one or more tasks.

18. The computer-readable storage medium of claim 17, wherein the instructions configure the at least one processor to:

determine the random hash value matches a task hash value associated with the one or more tasks.

19. The computer-readable storage medium of claim 17, wherein the instructions configure the at least one processor to:

determine the random hash value does not match at least one task hash value associated with the plurality of tasks;

generate a modified random position on the linear index, wherein the modified random position includes a modified random hash value; and select the populated position based on determining the modified random hash value matches a task hash value associated with the one or more tasks.

20. The computer-readable storage medium of claim 17, wherein the instructions configure the at least one processor to:

determine the random hash value does not match at least one task hash value associated with the plurality of tasks; and select the populated position by finding a nearest position to the random position on the linear index.

* * * * *